United States Patent [19]

Buneman

[11] Patent Number: 4,878,187

[45] Date of Patent: Oct. 31, 1989

[54] APPARATUS AND METHOD FOR GENERATING A SEQUENCE OF SINES OR COSINES

[75] Inventor: Oscar Buneman, Los Altos Hills, Calif.

[73] Assignee: The Board of Trustees of the Leland Stanford Junior University, Palo Alto, Calif.

[21] Appl. No.: 209,947

[22] Filed: Jun. 22, 1988

[51] Int. Cl.$^4$ .............................................. G06F 1/02
[52] U.S. Cl. .................................................. 364/721
[58] Field of Search ......................... 364/721, 729, 718

[56] References Cited

U.S. PATENT DOCUMENTS 3,569,684  3/1971  Burnett ................................ 364/729
4,584,658  4/1986  Ottobre et al. ....................... 364/721
4,718,030  1/1988  Tsutsumi ............................. 364/721

OTHER PUBLICATIONS

Tierney et al, "A Digital Frequency Synthesizer", IEEE Trans. on Audio and Electroacoustics, vol. AU-19, No. 1, 3/71, pp. 48-56.
Baker, "Suggestion for a Fast Binary Sine/Cosine Generator", IEEE Trans. on Computer, Nov. 1976, pp. 1134-1136.
Buneman, "Conversion of FFT's to Fast Hartley Transforms", SIAMJ. Sci. Stat. Comp., vol. 7, No. 2, pp. 624-638, 1986.
C. Oliver, "Stable Methods for Evaluating the Points cos ($i\pi/\eta$)", J. Inst. Maths. Applic., vol. 16, pp. 247-257, 1975.

Primary Examiner—Gary V. Harkcom
Assistant Examiner—Tan V. Mai
Attorney, Agent, or Firm—Fliesler, Dubb, Meyer & Lovejoy

[57] ABSTRACT

A data bank consisting of two tables of length log$_2$N suffices for the on-line creation of trigonometric functions of N successive angles, with only one addition and one multiplication per step. The data bank consists of some read only memory elements containing the half-secants of the angles $\delta$, $2\delta$, $4\delta$, $8\delta$, ... where $\delta$ is the spacing of the successive angles. (In Fourier transforms, one needs a $\delta$ of the form $\pi/2^N$.) The other half of the data bank is a random access memory of the same length as the ROM and is initially loaded with the trigonometric functions of that same set of angles. Mid-point interpolation based on values stored in the two tables is used to maintain entries necessary for successive angles. The second table begins, for instance, as a table of sines of the angles $2\pi$, $\pi$, $\pi/2$, $\pi/4$, $\pi/8$, etc., but whenever an entry has been used, it is replaced by a new entry, calculated by mid-point interpolation and to be used in a later step.

20 Claims, 2 Drawing Sheets

APPARATUS AND METHOD FOR GENERATING A SEQUENCE OF SINES OR COSINES

LIMITED COPYRIGHT WAIVER

A portion of this patent document contains material to which a claim of copyright protection is made. The copyright owner has no objection to the facsimile reproduction by anyone of the patent document, or of the patent disclosure as it appears in the U.S. Patent and Trademark Office patent file records, but reserves all other rights whatsoever.

BACKGROUND OF THE INVENTION

1. Field of the Invention

The present invention relates to devices for generating, to any accuracy, the sines or cosines of a sequence of equi-spaced angles. Such sequences are needed in digital signal analysis and in Fourier or Hartley transforms.

2. Description of Related Art

When one performs a harmonic analysis of equi-spaced signals, or of any digital data, one may need sines and cosines of equi-spaced angles, and real or complex combinations of such trigonometric functions. In Fourier transforming one must generate these functions at every "level." It is uneconomical, time-wise, to calculate the sines and cosines from mathematical routines at every step. On the other hand, to provide a full table is uneconomical space-wise.

The on-line creation of $\exp(i\alpha)$, $\exp(2i\alpha)$, $\exp(3i\alpha)$, by successive complex multiplication with $\exp(i\alpha)$ is not "stable": roundoff errors accumulate and an initial error grows exponentially. Similarly, using the sine/cosine addition rules for generating trigonometric functions of successive angles leads to a rapid build-up of errors.

To achieve stability, one must use interpolation, such as in pretabulation by successive halving for the exponential functions:

$e^{i\alpha} = 0.5\sec \delta(e^{i(\alpha+\delta)} + e^{i(\alpha-\delta)})$, starting with $\alpha = \pi/4$ and $\delta = \pi/4$ from $e^{i(\alpha+\delta)} = i$ and $e^{i(\alpha-\delta)} = 1$, then creating $e^{i\pi/8}$ and $e^{3i\pi/8}$, then $e^{i\pi/16}$, $e^{i3\pi/16}$, $e^{i5\pi/16}$, $e^{i7\pi/16}$, and so on (where "sec" is an abbreviation of secant). Only a short table of $0.5 \sec(\pi/4)$, $0.5 \sec(\pi/8)$, $0.5 \sec(\pi/16)$, ... needs to be supplied initially, just long enough to include the half-secant of the spacing of angles in the ultimate table. A full table of the functions of length $N = 2^n$ in steps $2\pi/N$ can be built from $n-2$ half-secants. This method is used in some simple transform programs (D. Buneman, "Conversion of FFT's to Fast Hartley Transforms," SIAMJ. Sci. Stat. Comp., vol. 7, no. 2, pp. 624–638, 1986), and recommended, because of its stability, in J. Oliver, "Stable methods of evaluating cos $(i\pi/n)$," J. Inst. Maths. Applic., vol. 16, pp. 247–257, 1975. But it requires memory space for the full table of N entries, because the trigonometric functions are not created in the desired order.

SUMMARY OF THE INVENTION

According to the present invention, a data bank consisting of two tables of length $\log_2 N$ suffices for the on-line creation of trigonometric functions of N successive angles, with only one addition and one multiplication per step. The data bank consists of some read only memory (ROM) elements containing the half-secants of the angles $\delta, 2\delta, 4\delta, 8\delta, \ldots$ where $\delta$ is the spacing of the successive angles. (In Fourier transforms, one needs a $\delta$ of the form $\pi/2^N$.) The other half of the data bank is a random access memory (RAM) of the same length as the ROM and is initially loaded with the trigonometric functions of that same set of angles. Mid-point interpolation based on values stored in the two tables is used to maintain entries necessary for successive angles. The second table begins, for instance, as a table of sines of the angles $2\pi$, $\pi$, $\pi/2$, $\pi/4$, $\pi/8$, etc., but whenever an entry has been used, it is replaced by a new entry, calculated by mid-point interpolation and to be used in a later step.

For convenience of the illustration of this procedure, the smallest desired spacing of angles is defined as "$\delta$" even when it is not a conventional degree, $\pi/180$, but is typically $\pi/256$ or $\pi$ divided by some other power of 2. The table then starts out as a table of, say, $\sin 512\delta$, $\sin 256\delta$, $\sin 128\delta \ldots$, $\sin 8\delta$, $\sin 4\delta$, $\sin 2\delta$, $\sin 1\delta$. When $\sin 1\delta$ has been used, it is replaced by $\sin 3\delta$, interpolating between $\sin 2\delta$ and $\sin 4\delta$. When $\sin 2\delta$ has been used, it is replaced by $\sin 6\delta$ (midway between $4\delta$ and $8\delta$), and so on.

The new sines are generated by accurate midway interpolation, using the formula:

$$\sin \alpha = [\tfrac{1}{2}\sec\delta][\sin(\alpha+\delta) + \sin(\alpha-\delta)]$$

and it turns out that the sines of $\alpha+\delta$ and $\alpha-\delta$ are always available in the RAM when needed to produce $\sin\alpha$.

The generator described here can be made to work for cosines by simply substituting "cos" for "sin" in the description. It also works for "cas", i.e., the combination cos+sin used in Hartley transforms. In the Fourier application, the sine and cosine generator are run jointly. Moreover, hyperbolic sines and cosines can be handled by the same device, but in that case, hyperbolic half-secants must be placed into the ROM. The combination cosh+sinh likewise can be dealt with and that is just the exponential function.

The term "trigonometric function" as used in the present application encompasses sines, cosines, hyperbolic sines, hyperbolic cosines, and combinations of such functions.

DESCRIPTION OF THE PREFERRED EMBODIMENT

Figure 1:
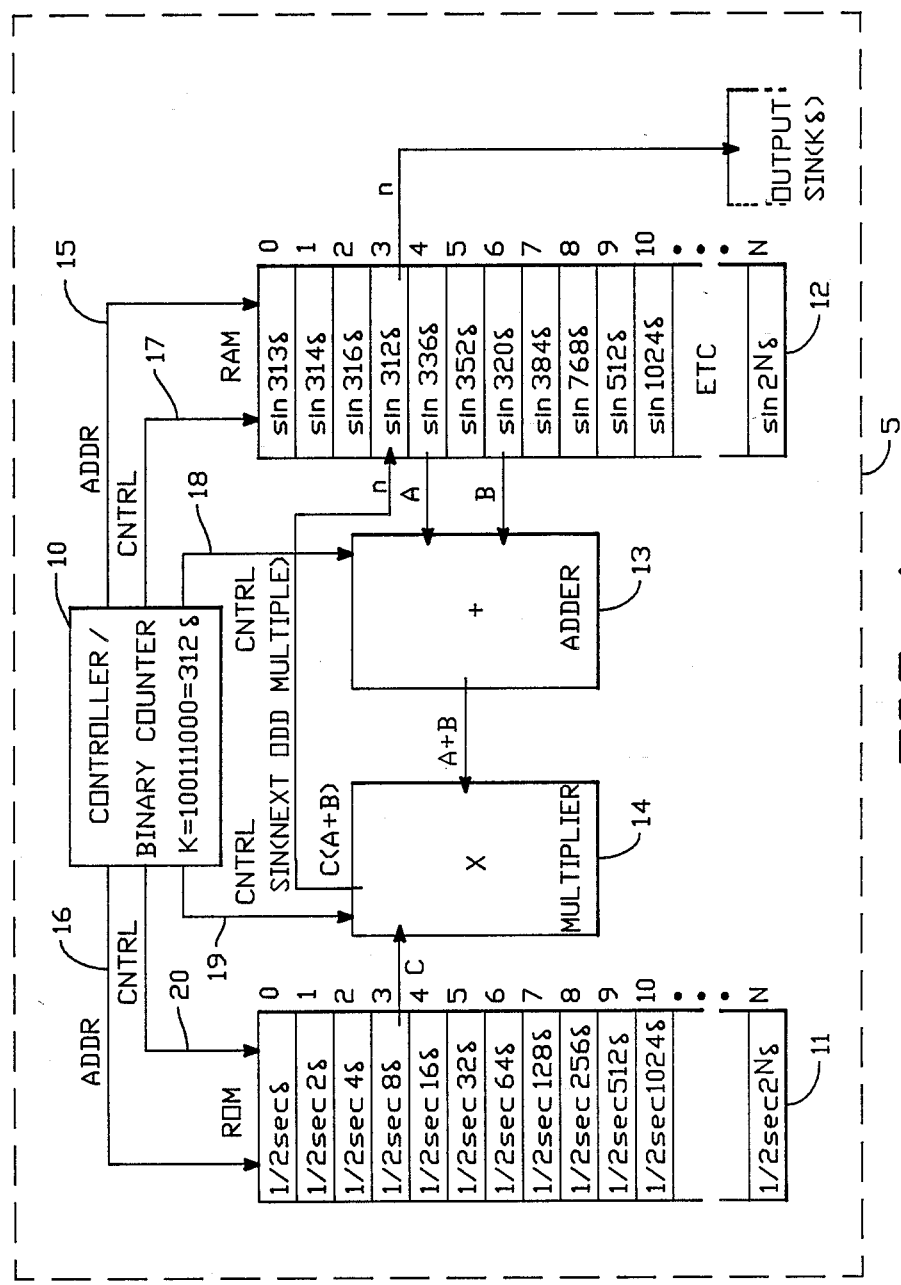
FIG. 1 is a block diagram of a processing apparatus according to the present invention.
Figure 2:
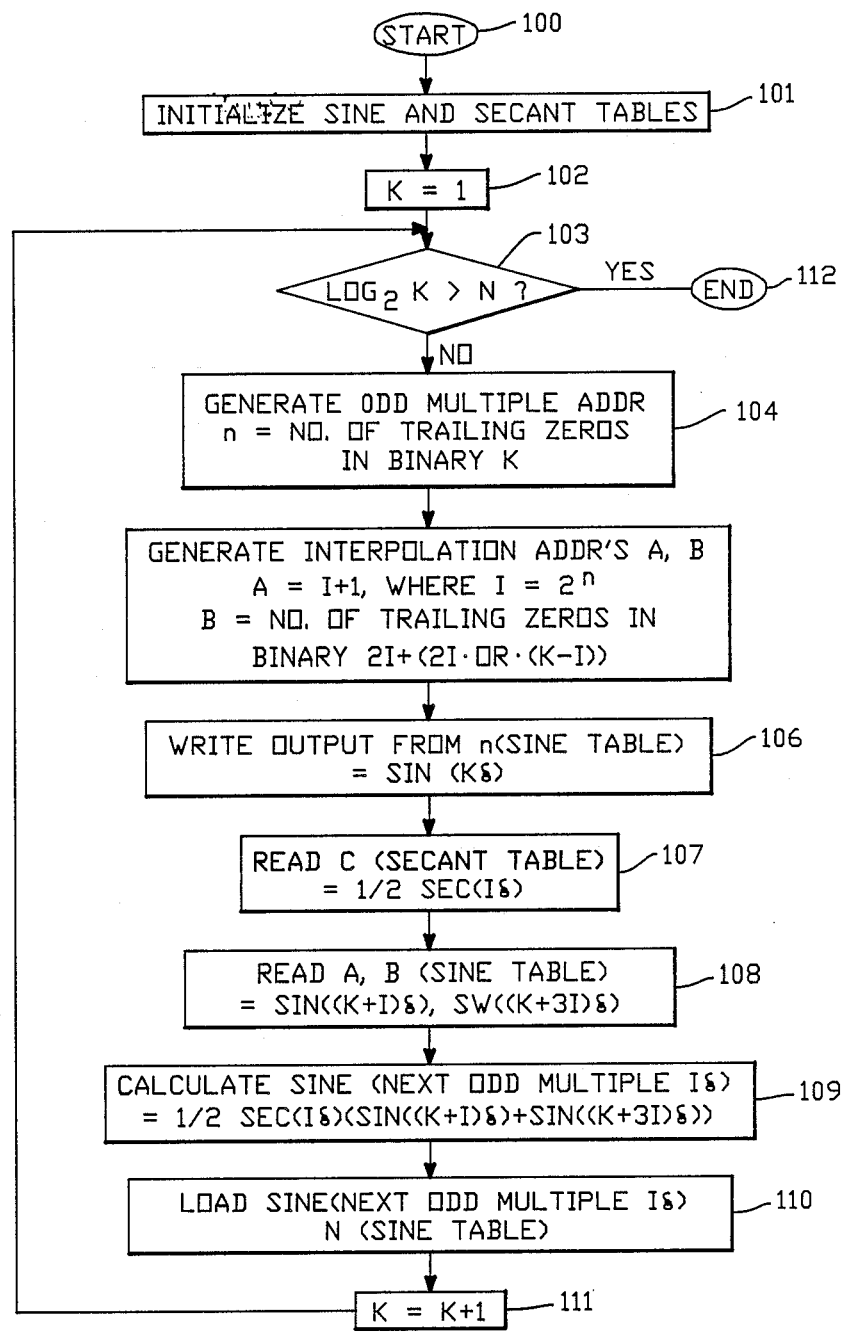
FIG. 2 is a flow chart illustrating the method of operation of a processor according to the present invention.

An implementation of the preferred embodiment of the present invention is described with reference to FIGS. 1 and 2. FIG. 1 is a block diagram of an apparatus 5 for on-line creation of trigonometric functions of N successive angles according to the present invention. FIG. 2 is a flow chart illustrating the operation of the apparatus shown in FIG. 1.

The generator apparatus 5 shown in FIG. 1 includes a controller/binary counter 10, a data bank including a first table 11, used in a read-only mode during generation of sines according to the present invention, and a second table 12 used in random access mode during generation of the successive sines.

Furthermore, a two-input adder 13 is connected to receive data from address A and address B from the RAM table 12 to generate an output A+B. A multiplier 14 receives the output A+B from the adder 13 and the value from the address C from the ROM table 11 to generate an output which is equal to C(A+B). The output C(A+B) is supplied as an input to the location n in the RAM table after the initial contents of the address n in the RAM table 12 have been delivered as the output value in the sequence as discussed below.

The controller/binary counter 10 generates address information on line 15 for the RAM table and address information on line 16 for the ROM table 11. In addition, the controller/binary counter 10 generates control signals on line 17 to the RAM table 12, line 18 to the adder 13, line 19 to the multiplier 14, and line 20 to the ROM table 11. The control signals on lines 17, 18, 19 and 20 are adapted to control operation of the circuit elements providing the RAM table, adder, multiplier, and ROM table so that they operate in the control sequence described below. The controller/binary counter 10 may be implemented as known in the art, using microprocessor technology, or discrete elements such as programmable logic devices and counters.

The adder 13 and multiplier 14 may be implemented using integrated circuit technology as known in the art, or may be incorporated into a microprocessor which also provides the controller/binary counter function. Obviously, many variations in the choice of hardware to carry out the present invention, are available to those skilled in the art.

The ROM table 11 and RAM table 12 may be implemented using a ROM, and a RAM, respectively. Alternatively, a single random access storage element may be used to provide storage space for both elements, with the ROM table 11 being used only in the read mode.

For very fast implementation, a microprocessor may be used, which incorporates a register file on the microprocessor chip itself which may be loaded with the ROM table 11 and RAM table 12 prior to execution of the sequence.

Operation of the apparatus shown in FIG. 1 is illustrated with respect to FIG. 2. The controller is initiated in block 100. At that time, the ROM table 11 is initialized with the half-secant of $2^n\delta$ for n=0 through N and the RAM table 12 is initialized with the sine of $2^n\delta$ for n=0 through N (block 101).

Next, the value K in the binary counter is set to 1 (block 102). The apparatus is then set to generate a sequence of sines of K$\delta$ for K=1 through up to $2^n$.

The algorithm begins by testing whether the log base 2 of K exceeds n. If it does not exceed n, the next sine in the sequence is to be calculated. This process begins by generating an odd multiple address n, where n is equal to the number of trailing zeroes in binary K (block 104). For K=1, n=0. For K=312 as illustrated in FIG. 1, n=3.

Next, interpolation addresses, A, B, are generated. Here A=n+1 and B equals the number of trailing zeroes in the binary 2I+(2I.OR.(K−I)) where I=$2^n$ where .OR. represents the logical OR function) (block 105). This can be accomplished by setting the bit location in K corresponding to 2I, then adding 2I to the result. For K=1, A=1 and B=2. For the example K=312 as illustrated in FIG. 1, A=4 and B=6.

Next, the output from the location addressed by n from the RAM table 12 is supplied as output, which is equal to sin(K$\delta$) (block 106). Then, the next entry for the location addressed by n in the sine table must be calculated. This is accomplished by reading the value at address C where C=n, from the secant ROM table 11.

The value read from the location C is multiplied by the value at A plus the value at B to form the sine of the lowest next odd multiple of I$\delta$, equal to $\frac{1}{2}$sec(I$\delta$)(sin((-K+I)$\delta$)+sin((K+3I)$\delta$) (block 109). Next, this sine is loaded to the location addressed by n in the RAM sine table 12 (block 110). Next, the value of K is incremented (block 111) and the algorithm loops to block 103. In block 103, K is tested to determine whether the end of the sequence has been reached. If it has been reached, the algorithm ends (block 112).

The generator 5 does not employ lengthy mathematical evaluations of the transcendental trigonometric functions. Nor does it call on long numerical tables.

A data bank of no more than typically 40 items, together with one adder and one multiplier, suffice to produce the successive sines of angles spaced as finely as a second of arc apart all the way from zero to 90 degrees or beyond. There is only one addition and one multiplication per sine.

As the successive sines are being supplied for use, the entries in the RAM table 12 are replaced by new sines produced with the aid of the adder 13 and multiplier 14. However, at all steps, the top of the RAM will contain the sine of an odd multiple of $\delta$, the next slot will contain the sine of an odd multiple of 2$\delta$, etc. FIG. 1 shows the state of the RAM table 12 when ready to supply the sine of 312$\delta$.

A general step consists of supplying the sine of the current angle from the RAM and making sure that further needed sines will become available from those present in the RAM. This is done by moving the sine from the slot below into the adder, together with another further down. Their sum is then multiplied by a half-secant pulled from the same level as the sine which had just been supplied as output. The result replaces that sine in the RAM.

The master controller 10 determines which RAM location contains the desired sine and which RAM location further down contains the second sine needed by the adder in the replacement procedure.

The master controller holds the angle count in binary form. For example, when the generator is to supply the sine of 312$\delta$, it registers the number 312 (100111000 binary) in the form:

$$312 = 2^8 + 2^5\ 2^4\ 2^3.$$

Since the angle is an odd multiple of 8$\delta$, its sine should be found in the fourth slot from the top (n=3). The next odd multiple of 8 after 312 is 328 and therefore sin (328$\delta$) must be placed in that slot to be available when the counter gets there. The interpolation will be between sin (336$\delta$) and sin (320$\delta$), using the half-secant of 8$\delta$. 336 is an odd multiple of $2^4$ and 320 is an odd multiple of $2^6$. The two contributors will be in the 5th (A=4) and 7th (B=6) slots down. Notice that $2^4$ is the next power after the lowest ($2^3$ in this example), in the binary decomposition of the counter, while $2^6$ is the first power absent after said next power, (after $2^4$ in this example). Therein lies the rule for determining the slots which are involved at each step.

The initial loading of the RAM should be restored after every use of the generator. When the sequence goes through a full 360 degrees, this happens automatically, and also when one only goes to 90 or 180 degrees, the restoration is a trivial operation. The precise length of the ROM and the RAM should be one more than the log (base 2) of the number of sines to be generated.

Twenty entries in each table offer the possibility of generating of the order of a million sines.

As an additional example of operation of the generator 5, suppose that sine 53δ has just been used. For the sake of this example, we will consider δ=1. At that point, the end of the table consisted of ..., sin 53, sin 54, sin 60, sin 56, sin 80, sin 96, sin 64, sin 128. 53 is an odd multiple of 1, so n=0. A=1 and B=2 by the rules discussed above.

The sine of the lowest next odd multiple of 1 in the successive angles, sin 55, replaces sin 53, interpolating between sin 54 and sin 56. The sequence proceeds as follows:

call sin 54, replace by sin 58, midway between 56 and 60
call sin 55, replace by sin 57, midway between 56 and 58
call sin 56, replace by sin 72, midway between 64 and 80
call sin 57, replace by sin 59, midway between 58 and 60
call sin 58, replace by sin 62, midway between 60 and 64
call sin 59, replace by sin 61, midway between 60 and 62
call sin 60, replace by sin 68, midway between 64 and 72, and so on.

The table address n, starting with zero, is always the number of trailing zeroes in the binary representation of the angle. For the example 312, which is 100111000 binary, the address n is 3, the fourth position from the end. In each interpolation to generate a new entry, the entry at address n+1 will be used. The other entry is further back in the table. How far back can be determined as follows:

Suppose that the angle K which has just been called had n trailing zeroes in its binary representation. This means its trailing set bit alone represents the number $I=2^n$. In twos complement arithmetic, I can be obtained by AND-ing K with $-K$ $$I = K.AND.-K.$$

Now sin K is to be replaced by sin (K+2I) (i.e., the next odd multiple of I), to be interpolated between sin (K+I) and sin(K+3I). We first form K−I, either by subtraction or by AND-ing K with the complement of I. In the result, we then set the next bit, the bit which alone represents the number 2I, as a result of which we form 2I.OR.(K−I). If that bit was already set, the result will equal K−I, else it will equal K+I. In either case we now have a number with just n+1 trailing zeroes. Next, we add 2I, forming 2I+(2I.OR.(K−I)). This is either K+I or K+3I, so it is one of the angles to be used for interpolation. On the other hand, it has more than n+1 trailing zeroes, so it tells us how far we have to go back up the table for the second interpolant.

The generator can be implemented on any computer under software control. The logic of using the bit positions in the binary counter as addresses n, A, B, C, although simple from the hardware point of view, is awkward to implement in a high-level language but can be done, as shown in the program in the Appendix.

The operation of finding the number of trailing zeroes of an integer is offered by some computers in their instruction repertoire. Others offer an instruction for finding the number of leading zeroes: the number of trailing zeroes can then be inferred from I formed by AND-ing with the negative. The number of trailing zeroes of I is $\log_2 I$ which can be obtained also by floating I and extracting its exponent.

The Appendix is a Fortran program creating the cosines of multiples of $\pi/512$. In the tabulation, the cosines of $4\pi$ an $8\pi$ are included so that the original table is restored automatically after one complete period. Notice the "infinite" value for the half-secant of $\pi/2$. This value happens to be irrelevant in the cosine routine. For a similar sine routine, the zero table entries are replaced by compensatory subliminal values. The accuracy of the result is that of the input data, to the sixth decimal place here. For the case $\alpha = \pi/512$, dealt with by a new method in the appended program, successive multiplication yields −0.000030 for cos ($\pi/2$) and 0.999807 for cos ($2\pi$). The new method gives zero and one exactly and never shows errors exceeding 1 in the sixth decimal place.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX

© Stanford University 1987

```
      DIMENSION HALSEC(11), COSTAB(13)
      DATA HALSEC/.5, -.5,.5E20,.707107,.541196,.509796,.502419,
     &.500603,.500151,.500038,.500009/,
     &COSTAB/1.,1.,1.,-1.,0.,.707107,.923880,.980785,.995185,
     &.998795,.999699,.999925,.999981/
      DO 1 K=1,1024
      I=K.AND.-K
      L=LOG2(I)
      WRITE(6,99)COSTAB(13-L)
      I=2*I+(2*I.OR.(K-I))
    1 COSTAB(13-L)=HALSEC(11-L)*(COSTAB(12-L)+COSTAB(13-
     LOG2(I.AND.-I)))
   99 FORMAT(F10.6)
      STOP
      END
C     THE FUNCTION LOG2(N), I.E.DETERMINING WHICH BIT OF
         N IS SET, SHOULD GENERALLY BE AVAILABLE AS AN
         ASSEMBLER INSTRUCTION.
C     IN FORTRAN, ONE CAN SEARCH FOR THE POWER OF 2 WHICH
         MATCHES N: FUNCTION LOG2(N)
      DIMENSION M(13)
```

APPENDIX-continued
© Stanford University 1987

```
      DATA M/1,2,4,8,16,32,64,128,256,512,1024,2048,4096/
      LOG2=0
   2  IF(N.EQ.M(LOG2+1))RETURN
      LOG2=LOG2+1
      GO TO 2
      END
```

What is claimed is:

1. An apparatus for generating a sequence of trigonometric functions for successive angles $K\delta$, for K equal to 1 through up to $2^N$ and $\delta$ equal to a constant, comprising:

a first storage array including N+1 storage locations addressed by addresses C, for C equal to 0 through N, the storage location addressed by C storing a value proportional to secant($2^C\delta$);

a second storage array including N+1 storage locations addressed by addresses n, A, and B, for n equal to 0 through N, where A and B are addresses in the range on 0 to N, the storage location addressed by n storing the trigonometric function for angle $S_n\delta$, where $S_n$ equals an odd multiple of $2^n$, the odd multiple being a lowest next odd multiple in the successive angles;

a counter generating K;

means, coupled to the first storage array and to the second storage array, for generating the trigonometric function of the lowest next odd multiple $S_n$ for storage in the location addressed by n, in response to data in the locations addressed by A, B and C; and a controller, coupled to the first storage array, the second storage array, the counter, and the means for generating, for calculating the addresses n, A, B, and C in response to K, and for controlling operation of the apparatus so that for each successive angle $K\delta$, the trigonometric function stored in the location addressed by n is supplied as output in the sequence, and is replaced by the trigonometric function of the lowest next odd multiple of $S_n$ in the successive angles.

2. The apparatus of claim 1, wherein:
   n=number of trailing zeroes in binary K,
   A=n+1,
   B=number of trailing zeroes in (2I+(2I.OR.(-K−I))), where I=$2^n$; and
   C=n.

3. The apparatus of claim 1, wherein the means for generating the trigonometric function of the lowest next odd multiple $S_n$ interpolates between the trigonometric function of the odd multiples $S_A$, $S_B$, stored in the locations addressed by A and B.

4. The apparatus of claim 1, wherein the trigonometric function of the odd multiple $S_A$ stored in the location addressed by A is the trigonometric function of an angle equal to one of $(K+I)\delta$ or $(K+3I)\delta$, and the location addressed by C stores 0.5 secant($I\delta$); and the means for generating the trigonometric function of the lowest next odd multiple $S_n$ sets;

$S_n = [\tfrac{1}{2} \sec] \; 0.5 \; \text{secant}(I\delta) \; (\text{trigonometric function} \; ((K + I)\delta) +$ $\text{trigonometric function} \; ((K + 3I)\delta)).$ 5. The apparatus of claim 1, wherein the trigonometric function is a sine.

6. The apparatus of claim 1, where the trigonometric function is a cosine.

7. The apparatus of claim 1, wherein the trigonometric function is a hyperbolic sine.

8. The apparatus of claim 1, wherein the trigonometric function is a hyperbolic cosine.

9. The apparatus of claim 1, wherein the trigonometric function is a combination of a sine and a cosine.

10. The apparatus of claim 1, wherein the trigonometric function is a combination of a hyperbolic sine and a hyperbolic cosine.

11. A method for generation of a sequence of trigonometric functions of successive angles $K\delta$, for K equal to 1 through up to $2^N$ and $\delta$ equal to a constant, in digital information processing systems, comprising the steps of:

storing in a first array of N+1 successive storage locations addressed by address C, data proportional to secant($2^C\delta$) for C equal to 0 through N;

storing in a second array of N+1 successive storage locations addressed by addresses n, A, and B, for n equal to 0 through N, where A and B are addresses in the range of 0 to N, the trigonometric function for angles $S_n\delta$, where $S_n$ equals an odd multiple of $2^n$, the odd multiple $S_n$ being a lowest next odd multiple in the successive angles;

generating a count of K;

calculating the addresses n, A, B, and C in response to K;

writing as output in the sequence, the trigonometric function, of the odd multiple $S_n$ stored in the location addressed by n; and generating the trigonometric function of the lowest next odd multiple $S_n$ for storage in the location addressed by n, in response to the data in locations addressed by C, A and B.

12. The method of claim 11, wherein:
    n=number of trailing zeroes in binary K,
    A=n+1,
    B=number of trailing zeroes in (2I+(2I.OR.(-K−I))), where I=$2^n$; and
    C=n.

13. The method of claim 11, wherein the step of generating the trigonometric function of the lowest next odd multiple $S_n$ interpolates between the trigonometric function of the odd multiples $S_A$, $S_B$ stored in the locations addressed by A and B.

14. The method of claim 11, wherein the trigonometric function of the odd multiple $S_A$ stored in the location addressed by A is the trigonometric function of an angle equal to one of $(K+I)\delta$ or $(K+3I)\delta$, the trigonometric function of the odd multiple $S_B$ stored in the location addressed by B is the trigonometric function of an angle equal to the other of $(K+I)\delta$ or $(K+3I)\delta$, and the location addressed by C stores 0.5 secant($I\delta$); and the step of generating the lowest next odd multiple $S_n$ sets;

$S_n = [\tfrac{1}{2} \sec] \; 0.5 \; \text{secant}(I\delta) \; (\text{trigonometric function} \; ((K + I)\delta) +$ -continued trigonometric function $((K + 3I)\delta))$.

15. The method of claim 11, wherein the trigonometric function is a sine.

16. The method of claim 11, wherein the trigonometric function is a cosine.

17. The method of claim 11, wherein the trigonometric function is a hyperbolic sine.

18. The method of claim 11, wherein the trigonometric function is a hyperbolic cosine.

19. The method of claim 11, wherein the trigonometric function is a combination of a sine and a cosine.

20. The method of claim 11, wherein the trigonometric function is a combination of a hyperbolic sine and a hyperbolic cosine.

* * * * *